United States Patent [19]

Hill

[11] 3,901,874

[45] Aug. 26, 1975

[54] MODIFICATION OF CARBOHYDRATES

[75] Inventor: William H. Hill, St. Paul, Minn.

[73] Assignee: Peter, Strong Research and Development Co., Inc., Port Chester, N.Y.

[22] Filed: Nov. 20, 1973

[21] Appl. No.: 417,553

Related U.S. Application Data

[63] Continuation-in-part of Ser. No. 342,393, March 19, 1973, abandoned, which is a continuation of Ser. No. 260,521, June 7, 1972, abandoned, which is a continuation of Ser. No. 39,601, May 22, 1970, abandoned.

[52] U.S. Cl........ 260/209.5; 260/209 R; 260/209.6; 260/233.3 A; 260/233.3 R; 260/233.5
[51] Int. Cl............................................. C08b 19/12
[58] Field of Search.......... 260/209 R, 209.5, 209.6, 260/233.3 R, 233.3 A, 233.5

[56] References Cited

UNITED STATES PATENTS

| | | | |
|---|---|---|---|
| 2,782,190 | 2/1957 | Fischer et al. | 260/209.6 |
| 3,236,792 | 2/1966 | Curtis | 260/209 R |
| 3,236,832 | 2/1966 | Opie et al. | 260/209 R |
| 3,300,473 | 1/1967 | Christoffel et al. | 260/209.6 |
| 3,324,109 | 6/1967 | Eichel | 260/209.5 |
| 3,349,078 | 10/1967 | Schweiger | 260/209.6 |
| 3,450,692 | 6/1969 | Hyldon et al. | 260/233.3 R |
| 3,691,153 | 9/1972 | Vemuri | 260/209 R |

*Primary Examiner*—Melvyn I. Marquis

[57] ABSTRACT

Carbohydrates or polysaccharides are treated to provide conversion products by means of acid agents, preferably surfactant sulfonic acids, in so-called "wet methods" or "dry methods". Free-flowing, particulate mixes are used which serve to increase the efficiency of the process.

3 Claims, 5 Drawing Figures

MODIFICATION OF CARBOHYDRATES

This is a continuation-in-part of application Ser. No. 342,393, filed Mar. 19, 1973, now abandoned which is a continuation of application Ser. No. 260,521, filed June 7, 1972 (now abandoned) which in turn is a continuation of application Ser. No. 39,601, filed May 22, 1970 (now abandoned).

The present invention relates to improvements in the production and utilization of modified natural carbohydrate materials, and in agents for effecting modification. More particularly the invention relates to the conversion of such carbohydrates to modified products by application of heat and catalytic additives.

The term carbohydrates is used herein interchangeably with polysaccharides and is to be understood to include such polysaccharides as cellulose, hemicelluloses; starches produced from grains, tubers, corms, rhizomes and other plant parts; plant hydrocolloids such as guar, locust bean gum, karaya, tragacanth, alginates, alginic acid, pectin, polygalacturonic acid, and others. It is believed that in the course of the aforesaid conversion or modification, several mechanisms are involved including mainly depolymerization, splitting off of side chains, hydrolysis, partial repolymerization, partial deesterification, some esterification, and possibly cross-linking and cross-bonding.

It is well known to hydrolyze starches and even cellulose all the way to their so-called building blocks, the sugars, primarily with the aid of strong acids. It is also well known to depolymerize such raw materials by treatment with certain enzymes. Furthermore, it is known to partially depolymerize, or hydrolyze, or oxidize starches by a certain treatment with strong acids, such as hydrochloric acid, or with hypochlorite, chlorine, etc., to form products known as "acid modified starches" and dextrins.

It is known, also, that heat alone depolymerizes material such as starch, and partially repolymerizes the fracture pieces to new polymers, even of ring structure, to form products known as "British gum", a form of dextrin. Because of the excessively high temperatures employed, these latter products are relatively dark in color.

In a process in which hydrochloric acid is employed in starch conversion, for instance, the reactions involved are often difficult to control because of the strength of this acid, and the products obtained tend to be non-uniform, and include undesirable mixtures of fracture pieces of a wide variety of chain lengths. Residual hydrochloric acid in the finished products often leads to continuing reaction on storage, with attendant changes in the properties of the products. In view of the uncertainty of shelf life, a consumer must, in many cases, promptly put to use the purchased materials to avoid erratic performance in his production because of changes that take place, in prolonged storage, in the acid modified starches which he purchases. On the other hand, the producer of hydrochloric acid modified starches and dextrins faces problems derived from the strength, severe corrosiveness, and volatility of this acid. His plant, if made of stainless steel, is very costly, or if constructed of less resistant metals it must be frequently repaired or replaced. Closed apparatus must be used to retain the acid vapors, or they are lost, and spotty and unpredictable results are obtained which require blending of batches to meet specifications. Continuous processing, which is considered efficient, economical, and desirable, is practically impossible because of the volatility of hydrochloric acid. Substitutes have been tried, such as, for instance, sulfuric acid, phosphoric acid, and certain organic acids, but these have been found wanting. Sulfuric acid is unsuitable primarily where high temperatures are involved, because of its dehydrating and charring action. The organic acids are considered costly and generally too weak. In spite of its disadvantages, hydrochloric acid has continued to be the chosen acid.

In connection with the present invention, it has been discovered that certain sulfonic acids, preferably organic sulfonic acids, are ideally suited for the purposes referred to above and to be enumerated hereinbelow. More especially, sulfonic acids with surfactant properties, such as long chain alkane sulfonic acids and the sulfonic acids of aromatic ring structures having at least one alkyl group of preferably more than ten carbon atoms as a ring substituent, are usable in the present invention. As examples of such acids, reference is made to those acids which are now used commonly as raw materials for the production of detergents, as for instance dodecylbenzene sulfonic acid in which the dodecyl group has either a straight chain structure or is highly branched. Instead of the single species, the commercially available acids are obtainable for use as mixtures of the acids with alkyl groups with about 10 to about 20 carbon atoms, and more usually alkyl groups with about 10 to about 18 carbon atoms. Manufacturers currently produce mixtures of the acids having a mean molecular weight close to that of dodecylbenzene sulfonic acid.

The commercial sulfonic acids, known as ABS acids, are obtainable, for instance, from "Neolene" (LS-320), and "Nalkylene" (SA597), products of Continental Oil Company. The typical alkyl group distribution of LS-320, based on propylene tetramer or dodecene, is:

| | |
|---|---|
| $C_{10}H_{21}$ | 4.5% |
| $C_{11}H_{23}$ | 25.9% |
| $C_{12}H_{25}$ | 53.4% |
| $C_{13}H_{27}$ | 11.7% |
| $C_{14}H_{29}$ | 3.4% |
| $C_{15}H_{31}$ | 2.0% |

The typical alkyl group distribution of "CONOCO" SA-597, based on n-paraffins, is:

| | |
|---|---|
| $C_{10}H_{21}$ | 13.9% |
| $C_{11}H_{23}$ | 40.8% |
| $C_{12}H_{25}$ | 35.9% |
| $C_{13}H_{27}$ | 8.9% |
| $C_{14}H_{29}$ | 0.5% |

So-called "keryl" benzene sulfonate may be mentioned. This is made from a refined kerosene fraction which is used to alkylate benzene, the alkylated product then being sulfonated. Straight-chain hydrocarbons of various chain lengths and of high quality obtained from petroleum are used to produce alkane sulfonic acids, which may be used in modifying carbohydrate materials. Mixtures of acids mentioned are noted for use as for example, hydrochloric and sulfonic acid, and others.

Other commercial acid products that are noted, are "Conoco" sulfonic acid 400, "Calsoft" LAS-99, and "Nacconol" SZA which are typical alkylbenzene sulfonic acid products of the general type known as ABS acids. ("Conoco" acids are made by the Petrochemical Division of Continental Oil Co.; "Nacconol" SZA is made by the National Aniline Division of Allied Chemical Corporation; "Calsoft" LAS–99 is made by Pilot Chemical Co.)

Organic sulfonic acids, including particularly the more specific types mentioned above, are of medium acid strength, sufficient for the purposes of the present invention. They are generally only mildly corrosive or non-corrosive; they are substantially non-volatile; and are normally liquid at atmospheric temperatures; they do not dehydrate or char carbohydrate materials; and they are available in practically unlimited quantity at low cost. Their outstanding advantage is their surfactant property which permits them to penetrate, for instance, the tough membranes surrounding starch grains or granules, thus enabling the acid to cause their rupture with concomitant swelling of the starch grains and with subsequent changes including hydrolysis, depolymerization, etc.

It is noted that particularly commercial grades of surfactant sulfonic acids contain concentrations of iron salts that may cause iron to be transferred to modified carbohydrate products. This is not likely to occur in "wet processing" but must be reckoned with in "dry processing" if the presence of iron in the finished modified carbohydrate products is objected to. While the iron salts in general do not interfere with the modification process, it is usually best to select for use in the process, commercial or technical surfactant sulfonic acids with the lowest possible iron content.

It is found that the acid modification of carbohydrate material may be carried out under dry, solid conditions or in a liquid medium. Under dry solid conditions, it is found advantageous to mix the generally thick, oily sulfonic acid agent with inert, finely divided solid, preferably the form of silica described hereinbelow. When conducting the modification of carbohydrate solid material in suspension, it is preferred to use water instead of diluent solvents such as alcohol, etc., which entail recovery costs and attendant fire hazards.

In connection with the present invention, it has been discovered that the modification treatment may be advantageously carried out without inclusion of water. In a sense, the sulfonic acids may be "solidified" for use in dry form when used to treat carbohydrate material in solid form. This makes it possible to employ temperatures at which the carbohydrate material in water would otherwise be completely gelled, whereas in the dry treatment at such temperatures greater speeds of reaction and more profound changes in the structure of the carbohydrate material are made possible.

In preparing the "solidified" surfactant sulfonic acids, an acid product obtained in the trade, such as, for instance, "Conoco" alkylbenzene sulfonic acid SA-597, is mixed with a minutely finely divided silica material, such as preferably the non-porous product known as "Cab-O-Sil" or COS (made by Godfrey L. Cabot, Inc.), or its equivalent, "Aerosil" (made by the Degussa Company). "Cab-O-Sil" is a colloidal, submicroscopic, pyrogenic silica prepared in a hot, gaseous environment by a vapor-phase, flame hydrolysis, at high temperature (1100° C.), of a silicon compound, such as silicon tetrachloride. It is distinct from silica gel obtained by precipitation of silicic acid from an aqueous silicate solution, and hardening of the precipitate.

Silica gel, thus formed, is internally porous and is therefore not as satisfactory as "Cab-O-Sil" for use in the present acid-treatment of carbohydrate material.

"Cab-O-Sil" contains no water-soluble inorganic salts. It is of highly chemical purity, low water content, has enormous external surface area and no internal porosity. It has a high degree of particle separation and the particles are almost spherical in shape. The properties and composition of a grade (M–5) of "Cab-O-Sil" are listed as follows:

| | | |
|---|---|---|
| Silica content (moisture-free) | 99.0–99.7 | % by weight |
| Free moisture (105° C.) | 0.2–1.5 | % by weight |
| Ignition loss at 1000° C. (excluding moisture) | 0.2–1.0 | % by weight |
| CaO, MgO | 0.00 | % by weight |
| $Fe_2O_3 + Al_2O_3$ | 0.01 | % by weight |
| Particle size range | 0.015–0.020 | micron |
| Surface area | 175–200 | sq.m./gm. |
| Specific gravity | 2.1 | |
| Color | white | |
| Refractive index | 1.46 | |
| pH (4% aqueous dispersion) | 3.5–4.2 | |
| Apparent bulk density | 2.5–7.0 | lb./cu.ft. |

A finer grade (H–5) of "Cab-O-Sil" has the above characteristics except for the particle size range which is 0.007–0.010 micron and a surface area which is substantially 325 sq.m./gm.

The various grades of "Cab-O-Sil", and the "Aerosil" product, as used interchangeably in the present treatment. Other inorganic solid materials, preferably submicron-sized, or of sufficiently small particle size and chemically inert toward the acid and carbohydrate material, and preferably with extensive outer surfaces may be used in preparing the "solidified" acid agent.

The acid and the silica material are mixed either dry, that is, the acid is added to the silica directly with intensive mixing followed by ball-milling of the dry mix, or the acid can first be diluted with solvents, such as water, alcohols, etc., and then the silica is introduced into the acid solution, mixed, and is permitted to form a somewhat gelatinous suspension which is subsequently dried by any conventional means, and finally ball-milled to yield the desired "solidified" surfactant sulfonic acid. The ratio of surfactant acid to the submicronic silica material is believed to be somewhat critical. The minimum amount of silica in the "solidified" acid agent which gives satisfactory results is about one-half of the weight of the acid, but apparently there is practically no upper limit since amounts of silica ranging from two to ten times the weight of the acid have been found to give good results. For practical purposes, the ratio of acid to silica by weight is preferably from 2:1 to 1:2. The "solidified" surfactant sulfonic acids thus prepared serve as highly effective solid catalysts in the dry conversion of carbohydrate materials to derived products such as dextrins, depolymerizates, hydrolyzates, etc.

The extremely small particle size of the silica material used (as small as about 0.01 micron) is an assurance of a complete coverage of the carbohydrate particles and complete surrounding of each particle with the acid. The surfactant acids used in preparing the catalysts serve to deagglomerate the silica particles which are in the form of agglomerates when delivered from a producer, and thus the final catalyst, after ball-milling of an initial mix of the acid and silica, tends to have the same or similar particle size as the silica particles themselves. The enormous covering power of the silica used has been observed and it is noted that if only one percent of the silica is added to and mixed with a powder of less than 400 mesh or with an average particle size of 22 microns, each such latter particle becomes surrounded by an estimated three million silica particles. By such complete coverage of the separate carbohydrate particles by the reagent or so-called "solidified" acid catalyst, highly uniform reaction conditions are rendered possible throughout a reacting mass of carbohydrate material and catalyst. As a consequence, the resultant final modified carbohydrate product is uniform and homogeneous.

It is noted that besides the acid strength, lack of corrosiveness, low volatility and other properties of the aforesaid surfactant sulfonic acids used in the conversion of carbohydrate materials or of polysaccharides to derivative products, certain beneficial effects, not obtained in the use of other acids, are produced. The said surfactant acids have a strong affinity for the surfaces of the particles of the carbohydrate materials and are tenaceously adsorbed thereon. A similar effect is likely to be observed on the molecular level where the surfactant acids remove cross-linking polyvalent cations (in the case of carboxyl-containing carbohydrates) since the acids form water-soluble salts with said cations, and thus contribute to the solubilization of otherwise poorly soluble carbohydrate material. Also, because of their relatively high molecular weight (over 300) and their generally long chain structure, these surfactant sulfonic acids are through to align themselves along the chain structures of the carbohydrate materials treated therewith and thus influence their general structure and behavior. Furthermore, the surfactant sulfonic acids serve to reduce or negate the effect of the fatty substances generally associated with starch granules and which tend to retard the swelling of the latter in water.

The hereindescribed, highly desirable mixtures of surfactant sulfonic acids and submicron-size silica particles, besides having the function of a reagent or an acid catalyst, have the ability of transmitting free-flowing properties to the carbohydrate materials with which they are mixed. By way of illustration, this effect is achieved by having from 0.5 to about 2.0% by weight of the silica material in a mix with carbohydrate material and the sulfonic acid. If one part per hundred of the sulfonic acid is used in the carbohydrate-catalyst mix, the preferred composition of the "solidified" acid catalyst would be from about one-half to about two parts by weight of the silica to about one part of sulfonic acid. The free-flowing property of the above described mix is of considerable importance in achieving highly desirable results in the processes of the present invention since it permits more intimate and uniform mixing of the components, greater compaction by vibrators or other devices, easier discharge from the reaction vessels, and eventual addition of the products of this invention to water without lumping or clumping which is often the case when mixing solids of hydrocolloidal character with water. The greater compaction of the carbohydrate-reagent or catalyst mix that results from the free-flowing property, permits an improved heat transfer in processing. Any stirring, tumbling or other type of mixing that may be found desirable during processing is greatly facilitated by reason of the free-flowing property of the mix.

When conducting the acid modification in the presence of water, or more specifically such modification of carbohydrate materials, including starches and grain flours, when conducted in aqueous suspension, greatly improved processing conditions in water are realized. A suspension, for instance of starch in water acidified with hydrochloric acid, settles out rapidly after stirring is stopped, and a very compact, hard bottom layer is formed which is difficult to stir and reform into a suspension. In contrast thereto, a suspension of starch in water acidified with a surfactant sulfonic acid remains a suspension for a long time when stirring is stopped. No hard bottom layer forms, and resumption of stirring results in immediate reformation of the original desirable type of suspension that is necessary for good processing. The special effects obtainable by virtue of the surfactant properties of the sulfonic acid catalysts are especially pronounced in an aqueous medium of the "wet processing" of carbohydrate material, since the contact between the latter material and the catalyst is the most intimate obtainable. The acid is more dissociated in water, than in the "dry processing", and is more effective as a hydrolytic agent. However, "wet processing" is restricted to the use of temperature levels at which the carbohydrate material does not gel, which is usually as low as 50° C. This restriction makes for a much lower reaction speed than is obtainable in "dry processing". It is to be understood that the term "dry processing" does not infer the complete absence of water from the reaction mix. Most carbohydrate materials have a natural moisture content of about 8 to 12% without appearing wet, or moist, or damp, or sticky. The inherent or natural moisture is in general desirable in "dry processing" although in such processing it is customary to pre-dry carbohydrate materials when the conversion or catalyst acid is intended to be added in diluted form to achieve better distribution over and throughout the carbohydrate material.

While "wet processing" is entirely feasible and useful with the surfactant sulfonic acids referred to herein, the most outstanding results are obtained in "dry processing". The lack of or low volatility, lack of corrosiveness, and medium acid strength of such acids render it possible to tailor the process conditions closely to a given set of needs, to employ simpler and less expensive reaction vessels and other apparatus and to device continuous methods of operation. The latter methods are most difficult, if not impossible, with the highly volatile acids employed in the art. The latter acids though highly active toward carbohydrate materials, usually yield results which are not readily or easily reproducible. The surfactant sulfonic acids of the present invention, with their more moderate reactivity, make it possible to so program the processing that dependably uniform and reproducible results are obtainable at all times. It is also noted that the final acid treated product will show at normal room temperatures very little continuing reaction due to retention of acid and thus will have good shelf life. The products obtained by use of strong acids, when the latter are left in the products and are not neutralized, generally have poor shelf life. The much lower acid strength of the surfactant sulfonic acids permits the retention of up to several percent of the acid in the final products without danger of severe "after-reaction". If desired, neutralization may be effected by use of gaseous ammonia, alkali or alkaline earth carbonates or hydroxides, magnesium hydroxide or carbonate, water-soluble borates like sodium metaborate and borax, and other alkaline or alkalizing materials of inorganic or organic nature.

If desired, reaction products of the "dry process" may be treated to remove the acid catalyst used, or its neutralization product, as well as reducing sugars and other cold-water soluble products. This is readily accomplished by suspending the products in water and filtering or centrifuging them to remove the water-soluble constituents, or by other procedures for the removal of water-soluble constituents, such as simple leaching, dialysis, etc. In some cases, particularly when plant hydrocolloids are dealt with, it is more advantageous for such purposes to use, instead of water, mixtures of alcohols and water in which the hydrocolloids are not soluble, or organic solvents per se, such as alcohols and other polar solvents, or such other solvents in which the processed carbohydrate material is not soluble but in which the acid catalyst and undesired constituents are soluble. In many instances, the surfactant sulfonic acid catalyst or its neutralization product may be left in the final carbohydrate reaction product and may actually prove desirable and beneficial because of the ease with which the products can then be incorporated in water without clumping or lumping.

The proportion of catalyst acid used in the modifying processes depends to a considerable extent on the temperature level of operation. In general, the higher the temperature, the smaller the proportion of acid needed in the process to obtain a desired result. For instance, in "wet processing", where the upper temperature limit is about 50° to about 60° C., for reasons stated above, the proportion of surfactant sulfonic acid used should be about 5 to 10% by weight with respect to starch when a starch is to be converted to what is commonly referred to as "acid modified" starch. Larger proportions of acid would be feasible, and would produce results in a shorter reaction time, but this would not be economical except where the acid filtrates are to be used repeatedly. Smaller proportions may be used but a longer reaction time would be required, or a lesser conversion would result, or both.

In "dry processing", the proportions of acid needed are generally smaller because considerably higher reaction temperatures may be used and are even desirable. Thus, with a grain or tuber starch, proportions of surfactant acid in the approximate range of 1% or less to about 5%, and more often 1 to 2%, are satisfactory and give good results at temperature levels from about 80° C. to about 100° C. Broadly speaking, the proportion of surfactant acid catalyst used in "dry processing" varies with the temperature and the duration of reaction time used in processing the carbohydrate material, and may vary from about 0.1% to about 10% by weight of the total mix. The lowest proportion of acid is usually preferred at temperatures of about 100° C. and above. The highest proportion of acid is usable when the processing temperatures are low, namely, from about 50° C. to about 90° C.

At lower temperatures than those referred to, the reaction is, for most purposes, too slow, unless larger proportions of acid catalyst are used. At higher temperatures than those indicated above, the reaction is so vigorous that reproducible results are not easily obtained and processing supervision is more exacting. Temperatures as high as 120° C. have been successfully employed in the production of completely cold-water soluble dextrins. As an illustration of a mixture which reacts at room temperature, it is noted that such mixture contains 100 parts by weight of potato starch and 4 parts of a "solidified" catalyst composed of 50% of a sulfonic acid designated in the trade as "Conoco" SA–597 and 50% "Cab-O-Sil" (grade H–5, which designates its fine particle size). The mixture was stored at ambient room temperature (about 20° to 30° C.) for about six months. When the resulting mixture was subjected to a cold-water solubility test, it showed a solubility of about 14%. This is an indication that some reaction took place during the prolonged storage, and the original starch (which is insoluble in cold water) was converted, at least in part, to an acid-modified starch. For many purposes such a product is useful without any heating, as for instance in paper making as an additive to the headbox, preferably after a brief pass through a jet cooker.

The most advantageous temperature of reaction depends to a certain extend of the kind of carbohydrate material used in a mix and on the kind of reaction product desired. For instance, in the treatment of starches and flours, to which reference has been primarily made hereinabove, temperatures of about 90° C. and above are indicated if dextrin type reaction products are wanted, while for the production of "acid modified" starches one would normally stay below this temperature unless very short reaction times are desired. Starches, in general, are sensitive to elevated temperatures and readily become discolored at temperatures above about 90° C. and, with prolonged reaction times, actually yield melts composed predominantly of sugars. Carbohydrate materials containing carboxylic acid groups are much more refractory at elevated temperatures and do not melt readily, nor do they discolor as much as in the case of starches. In the treatment of certain carbohydrate materials at temperatures of 90° C. and above for a prolonged time, such as 24 hours, a shortening of their chain lengths occurs with concomitant loss of their natural viscosity in solution; acetyl groups such as those contained in karaya gum are split off; and in the case of pectin and other gums containing uronic acid moieties, there is brought about a depolymerization to the basic structural units or low polymers thereof such as galacturonic acid or its di-, tri-, and tetra-polymer.

To illustrate the comparatively moderate loss of color encountered in processing carbohydrates of the nature of plant hydrocolloids, it is noted that in heating a citrus pectin of light tan color in admixture with the catalysts of the present invention in a closed container to 90° C. for 24 hours, the color is darkened to only a medium tan. Heating the same pectin mixed with the catalyst to 100° C. for 24 hours produced a darkening in color to a light chocolate color. Heating a sodium alginate product mixed with the catalyst for 24 hours at 100° C. produced an imperceptible darkening of the color, and the same was true when a guar gum with the catalyst was heated for 6 hours at 100° C. The products obtained from the above gums by the above treatment showed no sintering or melting of the original grains and the latter remained free-flowing. The pectin products obtained have a highly pleasing, fruity odor, and their aqueous solutions give with ferric chloride and alkali, deep dark red-brown chelate solutions which indicate that they are of galacturonic nature since they are stable under alkaline conditions. Similar deep dark-red iron chelate solutions are obtained from the product of depolymerization of sodium alginate. The depolymerized guar gum, when added to water, produces a gel which is less viscous than one that is obtained from the original guar before treatment with the acid catalyst, and this gel shows much less of the "snot" character (nasal mucus) exhibited by a normal guar gum. Moreover, the gel is remarkably resistant to putrefaction, remaining unspoiled in an open container for at least two weeks, while a gel made from guar without treatment and kept exposed under similar conditions becomes completely putrefied in two days, with a complete loss of its gel character.

The products of the present invention have a large number of uses. The starch derivatives serve well in the fields of adhesives for paper, paper board, plaster board; as sizing and coating agents in the manufacture of paper; as sizing and fulling agents in textiles; in the production of latex-type paints; and in other fields in which modified starches and dextrins produced in prior methods are used. Non-ionic or neutral plant hydrocolloids such as guar and locust bean gum, after at least partial depolymerization and/or hydrolysis, are of value in casting edible films and as ingredients in and bases for a variety of food products, in the manufacture of paper, for sizing, printing and finishing of textiles, and for other purposes, especially because of their resistance to putrefaction. This increased resistance is likely brought about by the heat and the acid catalyst treatment which destroys or inactivates the natural enzymes and/or organisms in guar and locust bean gum and in other plant hydrocolloids including pectin.

In a modification of the present invention, the starch, or other carbohydrate material or polysaccharide, in powdered form may be mixed with a submicron-sized, amorphous, preferably non-porous silica material in proportions indicated above, or in proportions with wider variation. Such a mix that is free-flowing is advantageous in handling in plant operations. This mix may be either used in the above-described acid treatment with a surfactant sulfonic acid, or the mix may be sold as a product for other uses.

The mix of the "solidified surfactant organic sulfonic acid" and the substantially dry cold-water insoluble polysaccharide is also free-flowing and is easily handled in plant operations. The acid, when uniformly and completely spread in a thin film on each particle of "Cab-O-Sil" or other suitable, inert, inorganic, solid, particulate material, in turn becomes uniformly distributed on or adjacent to the particles of polysaccharide, which thereby makes possible a uniform conversion free from the spottiness that otherwise is apt to occur in the dry treatment.

The terms "cold-water insolubility" and "cold-water solubility" as used herein, or in claims, refer to the insolubility and solubility in water at substantially 25° C.

For the preparation of the "solidified surfactant sulfonic acid catalyst" several procedures have been proposed, from which any of the following may be selected ("parts" are given by weight):

A. 100 parts of surfactant sulfonic acid ("Conoco" SA-597) are added drop by drop to 100 parts of "Cab-O-Sil" (Cabot Company, grade H-5) in a container with constant slow stirring. After all of the acid is added, the mixture is rubbed or spatulated in the container in which it was prepared and is then ball-milled at slow speed with relatively few stones. The mixture is ready for use as soon as the initial drop-like aggregates of the acid and the "Cab-O-Sil" can no longer be detected when rubbing or spatulating some of the mix on a glass plate.

B. 50 parts of surfactant sulfonic acid ("Conoco" SA-597) are dissolved in about 100 parts or more of anhydrous isopropanol and this solution is added to 50 parts of "Cab-O-Sil" (Cabot Company, grade H-5) by spraying while the "Cab-O-Sil" is stirred vigorously. The isopropanol is permitted to evaporate spontaneously at room temperature, and the mixture is dried at 105° C. until completely dry (determined by weighing to constant weight). The dry mix of acid and amorphous silica is ball-milled for a short time, such as about one-half hour, to crush any agglomerates that form in the process.

Instead of isopropanol, other alcohols may be used, or other solvents in which the surfactant sulfonic acid is freely soluble, but preferably in such solvent as does not form a gel with the "Cab-O-Sil". Water is a suitable solvent but it should be used in a proportion of more than two parts for one part of the acid because at low water to acid ratios, viscous solutions and even gels are formed which cannot be readily sprayed. Since the solvent used has the function of a carrier for the acid and is removed from the product before us, there is no limit as to the kind of solvent and the amount used in preparing the "solidified" sulfonic acid catalyst as long as an easily sprayable solution of the acid in the solvent is formed, and preferably one that is reasonably volatile at moderate temperatures.

C. 100 parts of surfactant sulfonic acid ("Conoco" SA-597) are dissolved in about 1000 parts of water. 100 parts of "Cab-O-Sil" (Cabot Company, grade M-5) are slowly added to the mix while stirring. A rather thick, jelly-like material is obtained which is made as homogeneous as possible by continued stirring and which is then dried in any conventional manner such as spontaneously in air, by heating in an oven at temperatures of about 105° C., or by infra-red heating, or on heated rolls, or by spray drying, or by other methods. In most cases, a final ball-milling is done, if desired, in order to crush lumps and make the product as uniform as possible. This is not essential particularly when the catalyst is ball-milled or otherwise ground together with the carbohydrate material or polysaccharide when subjected to treatment with the acid catalyst.

The invention is further illustrated by the following examples, in which parts are by weight unless otherwise specified:

EXAMPLE 1

4.2 parts of alkylbenzene sulfonic acid ("Conoco" SA-597) are added to 700 parts of water in an open container of suitable size. The container is provided with a heating jacket in which the heating medium is kept at about 55° to 60° C. so that the liquid in the container reaches a temperature of about 53° C. and remains at that temperature fairly steady for the duration of the process treatment. As soon as the contents of the container reach 53° C., 42 parts of a pearl corn starch (H. B. Fuller Co.'s No. 3) are introduced while agitating the liquid. Heating and agitation are maintained so that the desired temperature is kept fairly constant and the starch is kept in suspension without any settling. The total time of this treatment is 5 hours. At the end of this period, the contents of the container are neutralized with magnesium hydroxide to a pH of 6 to 6.5 (determined with test paper), and the treated suspended starch is filtered out and dried. The dry, loosely coherent grains are crushed which is easily accomplished because the particles of the product do not stick together. A viscosity test is made on this product as follows: 20 parts of the product are suspended in 180 parts of water with the aid of a stirrer while the temperature is raised quickly to 91° to 92° C. and held there for ten minutes. The resulting product is permitted to cool down to about 60° C. (140° F.) and its viscosity is measured in a well known manner in a Dudley pipette, a standard means used in the modified starch industry. The viscosity thus determined is found to be 87 seconds. Raw starch submitted to this viscosity test does not give a reading with the Dudley pipette because in the course of such test it forms a stiff, solid gel. Even by means of a Brookfield viscosimeter its viscosity could not be measured. This example serves to show that an alkylbenzene sulfonic acid can modify starch in an aqueous suspension.

EXAMPLE 2

0.32 part of ABS acid is dissolved in about 368 parts of water in an open container. About 32 parts of corn starch (Gristede) are added to the acid solution and a suspension is formed by stirring. A water bath is heated and a constant temperature of 86° C. is maintained with no variation greater than 1° above or below 86° C. The container with the starch suspension is placed in heat exchange relation to the water bath and kept there for ten minutes while stirring the contents of the container. By the end of the heating period, the contents reach a temperature of 78° C. The container is withdrawn from the water bath, 0.035 part of magnesium hydroxide is added and stirred in to neutralize the mix. The mix in the container is poured into a second container to a predetermined level and the latter container is tightly closed and placed in a water bath kept at a temperature of 30° C. for 16 hours (overnight) to bring the contents to a temperature of 30° C.

A comparison has been made of the product of this example with a product prepared with hydrochloric acid in place of ABS acid, and a product prepared from starch without an acid. The comparison is seen in Tables 1, 2, and 3, below and in FIG. 1 of the accompanying drawing which includes graphs prepared from the Tables.

In Table 1 the viscosity is given of each of five separate samples of the product prepared in accordance with the procedure in Example 2 except that each sample after the first was subjected to successively longer heating periods in the first-mentioned water bath kept at 86° C. For the second, third, fourth, and fifth samples, this heating period was 20, 30, 45, and 60 minutes respectively. The temperature of the mix therefore rose as shown in the second column of Table 1. The viscosity of each sample is noted in the third column.

Table 1

| Time (minutes) in Hot Water Bath. | Temperature (°C.) of Product at End of Heating Period. | Viscosity (centipoises) of Final Product. |
|---|---|---|
| 10 | 78 | 12,550 |
| 20 | 79 | 41,000 |
| 30 | 81.5 | 105,000 |

Table 1-Continued

| Time (minutes) in Hot Water Bath. | Temperature (°C.) of Product at End of Heating Period. | Viscosity (centipoises) of Final Product. |
|---|---|---|
| 45 | 84 | 85,000 |
| 60 | 86 | 49,500 |

In the procedure using hydrochloric acid instead of the ABS acid, the ABS acid was replaced by an equivalent proportion of hydrochloric acid, namely, 10 ml. of 0.1 N hydrochloric acid instead of the 0.32 parts of the ABS acid. The proportions of starch and water, the temperatures, the proportion and the kind of neutralizing agent, and the methodology employed were identical. The viscosity of each sample after the successive reaction periods corresponding to those in the tests with the above samples of the product prepared with ABS acid, is noted in the second column of Table 2. It is noted that the viscosity at the 60-minute interval is omitted. This test was not considered necessary since the viscosity had already turned downward at the 45-minute interval.

Table 2

| Time (minutes) in Hot Water Bath. | Viscosity (centipoises) of Final Product. |
|---|---|
| 10 | 400 |
| 20 | 16,700 |
| 30 | 45,500 |
| 45 | 37,500 |

In the treatment of starch in which acid is omitted, the proportions of starch and water were identical with those in Example 2 and the methodology was the same as that employed in obtaining the data for Tables 1 and 2. The resulting data are given in Table 3.

Table 3

| Time (minutes) in Hot Water Bath. | Viscosity (centipoises) of Final Product. |
|---|---|
| 10 | 2,100 |
| 20 | 16,000 |
| 30 | 47,200 |
| 45 | 165,000 |

At the 45-minute interval (Table 3) the starch gel was so stiff as to appear solid, and a viscosity was obtained only after the Brookfield instrument had effectively sheared the gel to a somewhat fluid condition.

Figure 1:
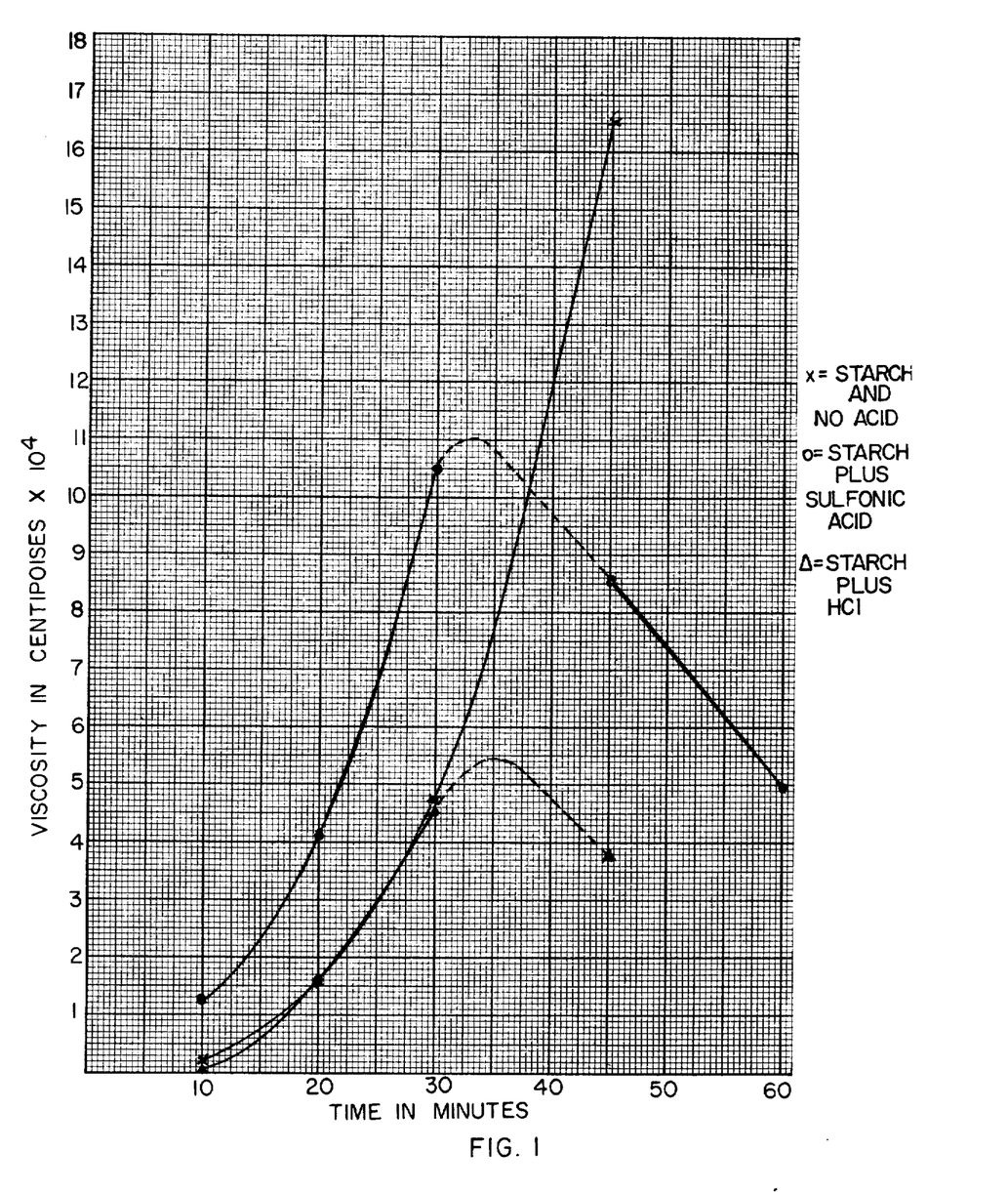

From the above tables and the graph in FIG. 1, it is noted that starch swells much more readily by the treatment with ABS acid than with hydrochloric acid, and than without acid. Also, the viscosity of the treated starch can be regulated better with ABS acid than with hydrochloric acid which is much more aggressive and quickly reduces initially produced viscosity by drastic depolymerization and apparently saccharification.

A number of similar tests were made on various starches treated with ABS acids, such as "Conoco" SA–597 and other surfactant sulfonic acids, and different neutralizing agents. Different kinds of potato starch and corn starch were tested, as well as tapioca starch, rice starch and wheat starch. Among the surfactant alkylaryl sulfonic acids there were besides "Conoco" SA–597, "Conoco" LS–320 (mixed with an equal proportion of propylene glycol), "Nacconol" SZA (Allied Chemical and Dye Corp.), and "Calsoft" LAS–99. Neutralizing agents were those mentioned above as well as sodium benzoate and borax.

In general, the various starches behaved alike except for some variation in viscosities, and especially in clarity of the gel, the potato gel being usually the clearest. There appeared to be no substantial differences resulting from the use of the different surfactant sulfonic acids used.

EXAMPLE 3

960 parts of potato starch (Stein-Hall Co.) in a substantially dry state, and 40 parts of "solidified" surfactant organic sulfonic acid catalyst made by the method A described above are ball-milled for two hours at low speed and with a small number of Burundum stones. This methodology achieves mixing rather than grinding. The mix was subjected to a number of tests for the purpose of determining the best temperature levels for the conversion of the starch to a variety of products ranging from acid modified starches of low cold-water-solubility to dextrins substantially completely soluble in cold water. The tests are described immediately below, under X, Y, and Z.

X. A sample of the product of Example 3, weighing 5 grams, was placed in each of three glass pressure flasks. The flasks were closed and were heated in an electric oven at 90° C. for 4 hours, 24 hours, and 48 hours, respectively. The three flasks were simultaneously placed in the oven and one of them was withdrawn at the end of the four-hour period, another at the end of the 24 hour period, and the third at the end of the 48 hour period. When cold, the product in the first flask was white, not sintered, and had a slight dextrin odor. The product in the second flask, when cold, was light tan, fairly well sintered, and had a light dextrin odor. The 48-hour product had a deep tan color, was well sintered, and had a pronounced dextrin odor. The cold-water solubility of each of these products is indicated in the solubility curve labeled "90° C." in FIG. 2 of the accompanying drawing.

Y. 5 samples of 10 grams each of the starch treated in accordance with Example 3, were each heated in a separate flask at 100° C. One was subjected to the heating for 1 hour, another for 2 hours, the third for three hours, the fourth for 4 hours, and the fifth for 18 hours. When cold, the following observations as to the characteristics of each sample were made:

| Sample heated for: | Characteristics of heated product. |
| --- | --- |
| 1 hour | Starch odor, color white, sample loose. |
| 2 hours | Starch odor, color white, sample loose but slightly sintered. |
| 3 hours | Starch odor, color faint tan, sample somewhat sintered. |
| 4 hours | Dextrin odor, color light tan, sample more sintered and stuck to the flask. |
| 18 hours | Dextrin odor, color very dark brown, sample sintered or fused. |

Figure 2:
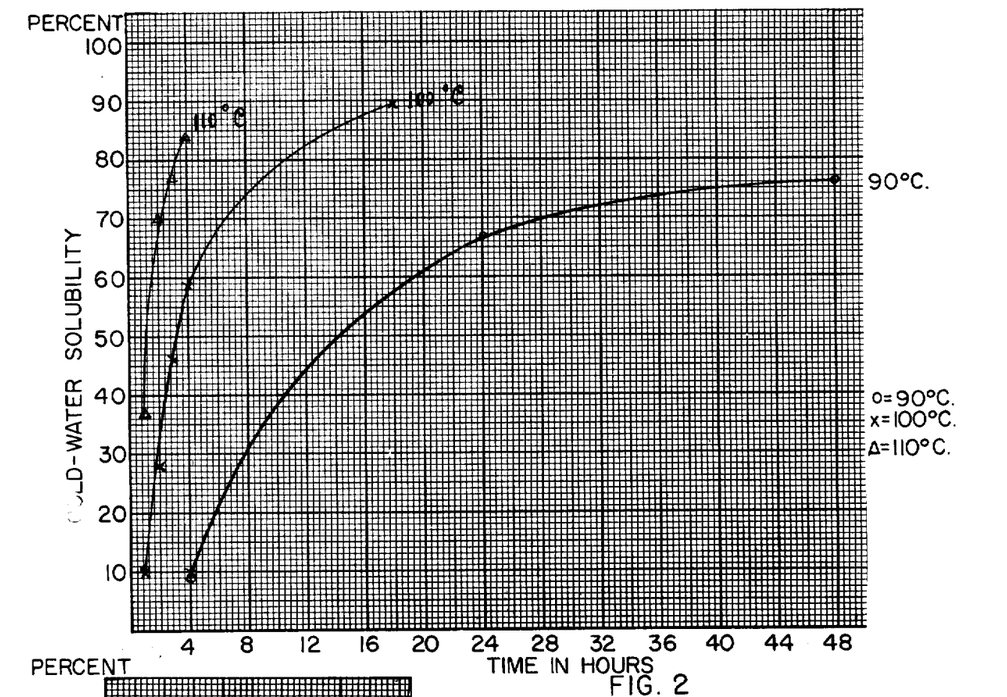

The cold-water solubilities of these five samples are indicated in the curve labeled 100° C. in FIG. 2 of the accompanying drawing.

Z. 4 samples of 10 grams each of the acid-treated starch product of Example 3 were heated at 110° C. in the manner outlined in test X but the times of heating were changed. One sample was heated at 110° C. for one hour in a glass pressure flask. Another was heated for 2 hours, a third for 3 hours, and a fourth for four hours, each one under the conditions prescribed for the first sample. When cold, the following observations were made as to the characteristics of each sample:

| Sample heated for: | Characteristics of heated product. |
| --- | --- |
| 1 hour | Starch odor, color white, sample loose. |
| 2 hours | Dextrin odor, color light cream, granules stuck together |
| 3 hours | Dextrin odor, color medium cream, sample caked. |
| 4 hours | Dextrin odor, color light tan, sample caked. |

The cold-water solubilities of these samples are indicated in the curve labeled 110° C. in FIG. 2 of the accompanying drawing.

EXAMPLE 4

A starch-catalyst mix is prepared in a manner described in Example 3, but the catalyst used is prepared in accordance with method C above.

Figure 3:
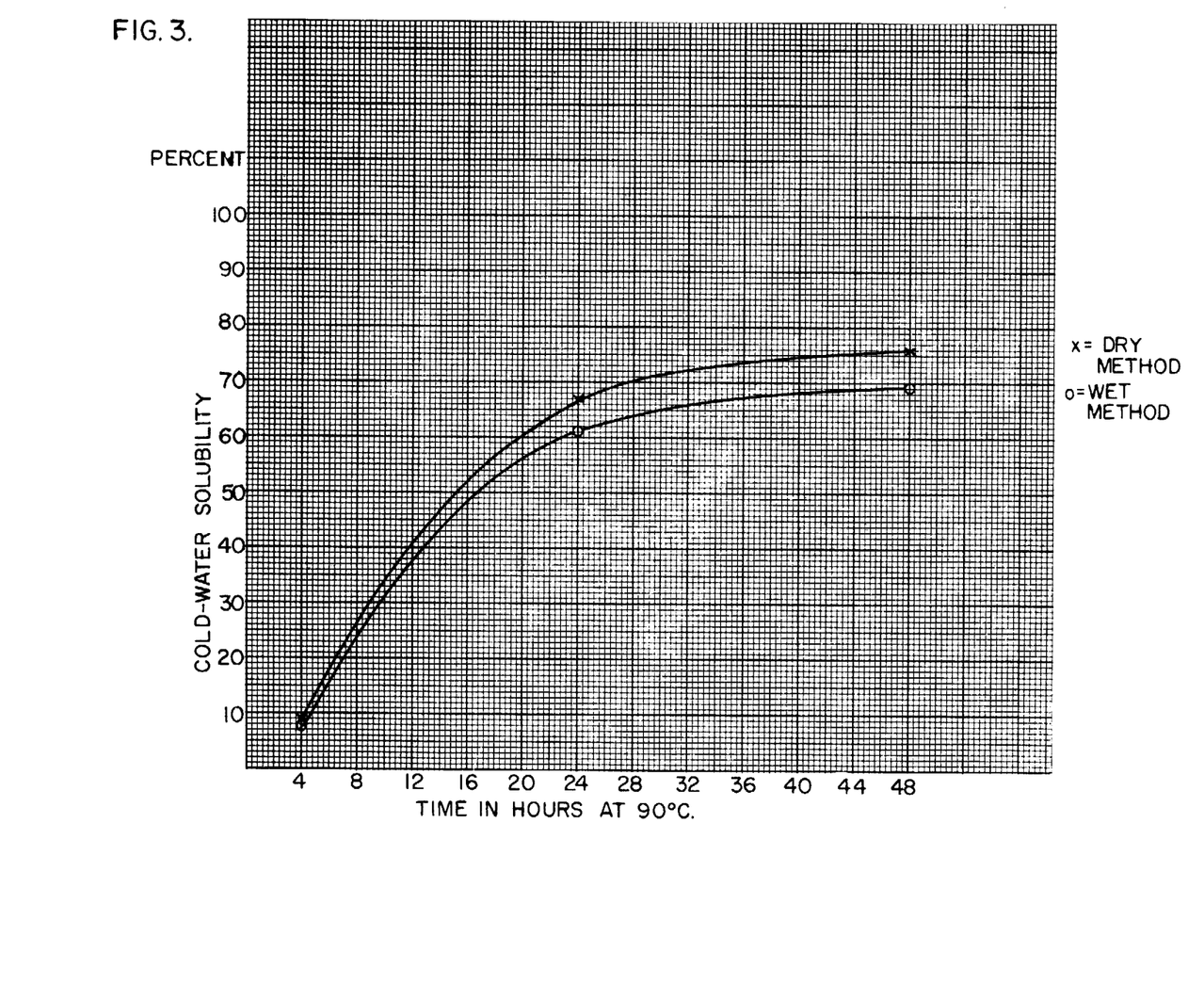

A series of heating tests was made on the product of Example 4 in the same manner, with the same quantities, and at the same temperature as described in Example 3, paragraph X. The cold-water solubilities obtained on the heated products are shown by the curve labeled "Wet Method" in FIG. 3. The cold-water solubility curve for the samples of the product prepared in accordance with paragraph X of Example 3 are also shown in FIG. 3, and labeled "Dry Method", for purposes of comparison. This comparison shows that the two different catalysts yield substantially the same results.

EXAMPLE 5

10 parts of the catalyst prepared as set forth in method B above, are mixed with 240 parts of tapioca flour (Stein-Hall Co., superior AA grade). This mixture is ball-milled for about 2 hours. The mix is separated from the stones.

Five 50-gram samples of the product of Example 5 were heated in glass pressure flasks as described above, at 100° C., one sample for 2 hours, another for 3 hours, the third for 4 hours, the fourth for 6 hours, and the fifth for 7½ hours. When cold, the characteristics of each sample were noted as follows:

| Sample heated for: | Characteristics of heated product. |
| --- | --- |
| 2 hours | Starch odor, color white, sample loose. |
| 3 hours | Starch odor, color white, sample loose. |
| 4 hours | Starch odor, color white, sample loose. |
| 6 hours | Dextrin odor, color light cream, sample slightly lumpy. |
| 7½ hours | Dextrin odor, color light tan, sample showed considerable lumpiness but no sintering. |

Figure 4:
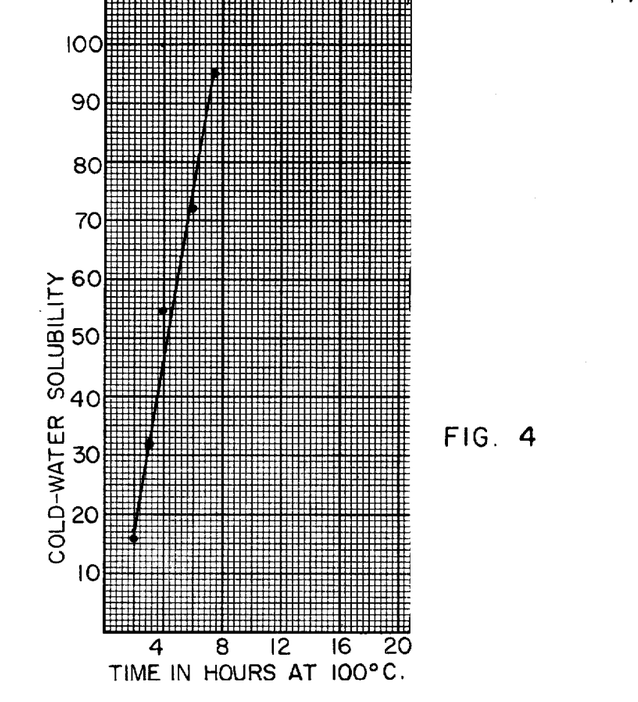

The cold-water solubilities of the samples are indicated in the curve in FIG. 4 of the drawing.

EXAMPLE 6

2880 parts of corn starch (Clinton Co.), powdered, are mixed with 120 parts of a catalyst prepared with a surfactant sulfonic acid ("Conoco" SA-597) and "Cab-O-Sil" (Cabot Co. H-5) in equal parts, by the method C above. The mix is ground in a ball-mill for two hours.

The product of Example 6 was submitted to the following tests:

a. Seven pint-size Mason jars were filled with the product to the lower part of the neck in equal amounts, and the lids were tightly closed. The seven jars so filled were heated in a large forced-draft oven with substantially perfect temperature control at 80° C. One jar was taken out of the oven at the end of 2 hours; the second at the end of 4 hours; the third, 6; the fourth, 8; the fifth, 16; the sixth, 32; and the seventh, 48 hours. The jars were permitted to stand for 24 hours to cool completely to room temperature and to allow reabsorption of moisture by each sample of the product. The following observations as to characteristics of each sample are noted:

| Sample heated for: | Characteristics of heated product. |
|---|---|
| 2 hours | Color white, sample loose and free-flowing. |
| 4 hours | Color white, sample loose and free-flowing. |
| 6 hours | Color white, sample loose and free-flowing. |
| 8 hours | Color very faint cream, sample loose and free-flowing. |
| 16 hours | Color very faint cream, sample loose. |
| 32 hours | Color very faint cream, sample loose. |
| 48 hours | Color very faint cream, sample loose. |

Figure 5:
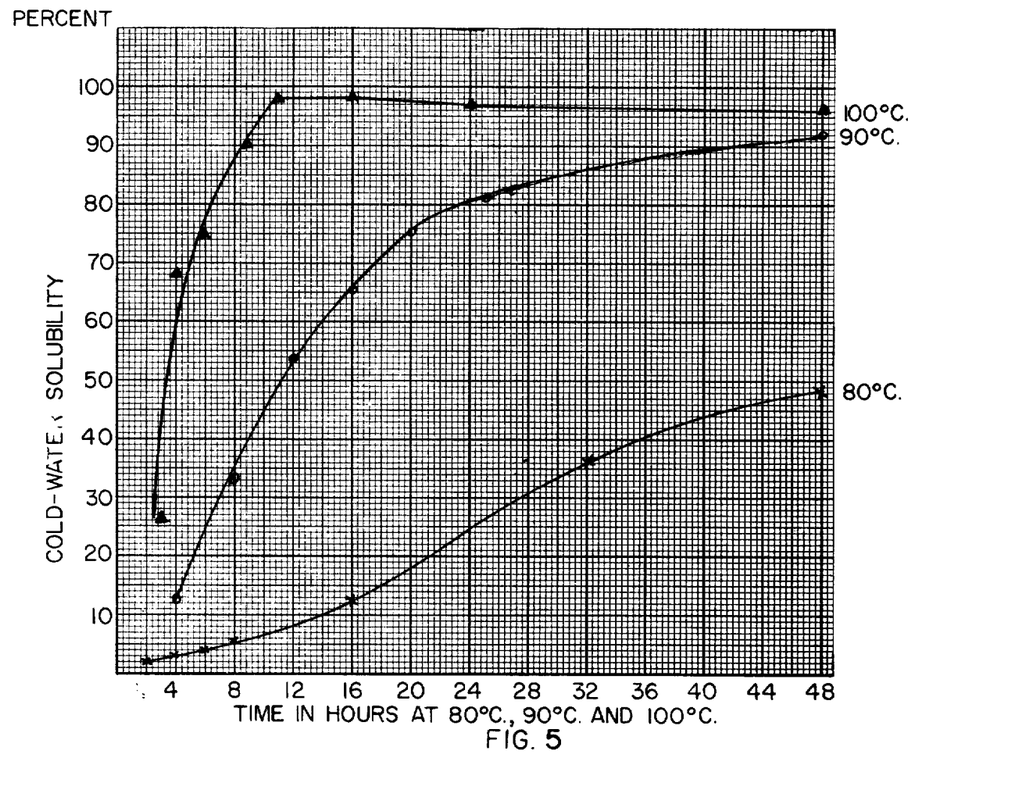

The cold-water solubilities of these seven samples are indicated in the curve, labeled "80° C.", in FIG. 5 of the drawing.

The samples of the products of Example 6A were subjected to standard viscosity determinations with a Dudley pipette under operating conditions set forth in Example 1, except that the viscosities were measured at three temperature levels. The results obtained are tabulated as follows:

| Sample heated for: | Viscosities, Dudley pipette, seconds. | | |
|---|---|---|---|
| | at 140° F. | at 120° F. | at 100° F. |
| 2 hours | Product too stiff to measure viscosity. | | |
| 4 hours | 66 | 73 | 102 |
| 6 hours | 45 | 49 | 55 |
| 8 hours | 41 | 43 | 46 |
| 16 hours | 37 | 38 | 39 |
| 32 hours | 36 | 36 | 37 |
| 48 hours | 36 | 36 | 37 |

These results show that the samples of the products of Example 6a were mainly of the thin-boiling acid modified starch type.

b. Eight 50-gram samples of the same mixture of corn starch and catalyst used in the preparation of the products of Example 6a were separately placed in eight glass pressure flasks. Each flask was tapped briskly on a hard surface to compact the contents. The samples were heated in an electric oven without forced draft at 100° C. One flask with the contents was withdrawn at the end of a three-hour heating period; another at the end of 4 hours; a third, 6 hours; a fourth, 9 hours; a fifth, 11 hours; a sixth, 16 hours; a seventh, 24 hours; and the eighth, at the end of 48 hours. The following observations were made as to the characteristics of each of these samples after cooling to room temperatures:

| Sample heated for: | Characteristics of heated product. |
|---|---|
| 3 hours | Color white, sample powdery. |
| 4 hours | Color white, sample powdery not sintered. |
| 6 hours | Color very light cream, sample not sintered but a little lumpy. |
| 9 hours | Color light tan. |
| 11 hours | Color dark brown, sample molten when hot and solid when cold. |
| 16 hours | Color dark brown, sample molten when hot and solid when cold. |
| 24 hours | Color brown-black, sample molten when hot and solid when cold. |
| 48 hours | Color brown-black, sample molten when hot and solid when cold. |

The cold-water solubilities of these eight samples are indicated in the curve labeled "100° C." in FIG. 5.

c. The same mixture of corn starch and catalyst described above and used in tests 6a and 6b was used in seven tests conducted at 90° C. in a large forced-draft oven. 50 grams were introduced in each of seven glass pressure flasks for these tests. The time periods for heating were 4 hours, 8, 12, 16, 20, 25, and 48 hours. When cooled to ambient room temperature, the samples of the first four heating periods were seen to be white in color, and the last three were a very light cream color or nearly white. The cold-water solubilities of these seven samples are indicated in the curve labeled "90° C." in FIG. 5 of the drawing.

EXAMPLE 7

While most of the above examples have dealt with dry starch conversions in the presence of 2% of the surfactant sulfonic acid catalysts reckoned on the total mixture being processed, tests were made as follows with only one percent of acid catalyst:

196 parts of powdered corn starch (Clinton Co.) are mixed with 4 parts of 1:1 mixture of alkylaryl sulfonic acid ("Conoco" SA-597) and "Cab-O-Sil" H-5 (Cabot Co.), which mixture is prepared by the method in paragraph C above. Mixing is done by hand.

Tests were performed on the product prepared in accordance with Example 7, by heating an equal amount in each of three closed glass pressure flasks at a temperature of 100° C. in an electric oven. One sample was heated for 1 hour, the second for 2 hours, and the third for 3 hours. When cold, the products of the 1 and 2-hour heating were white and had a starch odor, while the product of the three hours heating period was light cream in color and had a dextrinous odor. The cold-water solubilities were 0.5, 0.6, and 1.2% respectively.

EXAMPLE 8

It was found that a continuous process of preparing modified carbohydrate material is highly feasible by reason of the use of acid in the form of the hereindescribed solidified surfactant sulfonic acid catalyst. A continuous belt with belt-linked sections may be used for passing a mix through a tunnel oven. A Teflon-coated aluminum or iron pan may be provided on each section, and a ball-milled mix of a substantially dry carbohydrate material, such as corn starch or the like, and the "solidified sulfonic acid catalyst" may be distributed on each pan to form a layer of the mix about ⅛ to ½ inch thick as the belt passes a charging zone. While passing through the oven, the mix is heated at a temperature of, for instance, 100° C. The speed is so controlled that by the time a pan reaches the outlet end of the oven, a desired modification is reached as is determined by a cold-water solubility test or by a viscosity test. During the heating stage, no detrimental caking results under the improved conditions and the heated product remains free-flowing. At the outlet end of the oven, each pan is turned over so that the heated layer is readily dropped out as a modified starch product.

The following examples illustrate further the depolymerization of natural plant hydrocolloid gums, containing the uronic acid or anhydrouronic acid moiety, all the way down to the actual monomers or low polymers capable of forming complexes or chelates with iron and other di- and trivalent metals such as calcium, cobalt, nickel, manganese, copper, zinc, and others. Monovalent ions, such as those of sodium, potassium, ammonium, are used to make these complexes water soluble.

EXAMPLE 9 a. Two parts by weight of ABS acid SA–597 (produced by Continental Oil Company) are added dropwise to 4 parts by weight of "Cab-O-Sil" H–5 (Cabot Co.) and well stirred. 100 parts by weight of citrus pectin (Mutual, 220 grade) are added to the resulting mixture and are stirred in until a substantially uniform mix is obtained. This mix is placed in a ball mill provided with small Burundum stones and rolled on the roller mill for about ½ hour. An additional 94 parts by weight of the pectin and an additional small number of the stones are added to the mix in the mill, and the mix is rolled for substantially an additional hour. If inspection of the interior of the mill shows that the stones or the walls of the mill have adhering crusts of the mixture under treatment, or whenever there is not good "clanging" during the milling operation, additional stones are added, and rolling is continued for an additional period. When the "clanging" is considered good, the mill is opened and the contents are dumped on a 20 mesh screen. A desirable condition of the walls of the mill and the stones is reached when they are free of pectin, ABS acid and C—O—S. An accumulation of a very small amount of dust is not objectionable.

b. 20 parts by weight of the mixture above produced in section (a) of Example 9, are placed in a tightly closed vessel and the charge is heated at a controlled temperature of 90° C. for 24 hours. Thereafter the vessel and contents are permitted to cool down completely to room temperature. Any water that separates from the heated mixture in the vessel is recombined with the contents by isothermal distillation. When the vessel is opened, the contents are found to be no longer under pressure. The contents have a very pleasant fruity odor, remain loose and granular. The color of the product is somewhat darker than that of the original charge.

By way of test, a sample of the product may be added to water, some ferric chloride solution added, and finally, very slowly, some approximately 0.1 normal sodium hydroxide solution, in small increments until the mixture becomes alkaline with a pH of about 8. Initially, there is a precipitation of a brown-red gel. The latter dissolves to some extend and a clear, dark red-brown solution is formed.

The test product when left standing exposed to the atmosphere, eventually dries out forming shiny, red-brown chunks. On adding water, a red-brown gel and red-brown solution are reconstituted. On further standing, the red-brown gel disappears and there remain a thickly, dark-brown-red solution and a very small amount of a white, bottom sediment which can be stirred up readily and which consists of C—O—S. The solution is somewhat acid (pH 5 to 5.5). Since the original solution is alkaline (pH about 8) the galacturonic matter is believed to be demethoxylated by the alkali and/or by the catalytic influence of the iron it contained.

A second small amount of the heated pectin above obtained in section (b) of Example 9, when added to water, allowed to stand for several hours at ambient room temperature, and then mixed with a ferric chloride solution, first forms a precipitate which is believed to be an iron salt of the heated pectin, apparently the complex in its water-insoluble form. On gradual addition of solid sodium carbonate monohydrate, a dark red-brown solution is produced which when centrifuged yields a clear, dark red-brown solution, and a cream-colored sediment. This sediment, after further washing and centrifuging with water, is the C—O—S used. The clear, dark red-brown solution has a pH of substantially 8 to 10.

In view of the above, a water-soluble iron chelate or iron complex of galaturonic acid, or of a low molecular weight polymer thereof, is formed.

c. Substantially 10 to 20 parts by weight of the pectin-catalyst mix (section (a) of Example 9) is placed in a pressure vessel and heated at a controlled temperature of 100° C. for 24 hours. The resultant product has a light chocolate-brown color, considerably darker than the corresponding product set forth in section (b) of Example 9. It has the same distinct fruity odor. When mixed with water, ferric chloride solution, and sodium carbonate, a dark red-brown solution is obtained which is clear after centrifuging and contains a complex of iron and the galacturonic acid moiety of the pectin, and sodium ions. A very small amount of a cream-white bottom sediment is separated in the centrifuge.

d. 96 parts by weight of polygalacturonic acid are mixed with 4 parts by weight of the solidified surfactant sulfonic acid catalyst composed of equal parts of ABS acid and C—O—S and made, for instance, by the procedure B above. The mixture is heated in a pressure vessel for 24 hours at 100° C. The heated product shows complexing ability when subjected to tests described in sections (b) and (c) in Example 9.

EXAMPLE 10 a. 96 parts by weight of alkali alginate (Kelcosol KL) are mixed with 4 parts by weight of dry catalyst composed of equal parts of ABS acid (SA–597 of Continental Oil Company) and C—O—S (Cab-O-Sil grade H–5 of Cabot Company). The catalyst is prepared by procedure B above. The mixture is ball-milled for about one hour with Burundum stones. The product is non-caking.

b. 25 parts by weight of the mixture described above in section (a) of Example 10 are placed in a pressure vessel which is closed and heated for 24 hours at a controlled temperature of about 100° C. The vessel is permitted to cool to ambient room temperature. When cooled, no pressure is noted in the vessel. The cooled product has a mild fruity odor. Its color is somewhat more tan than the original material. On treatment of this product with water, ferric chloride solution, and sodium carbonate, as described in Example 9, sections (b) and (c), substantially the same observations are made, namely, the formation of a dark, red-brown solution, indicating the formation of a complex of iron with the uronic acids of the alginate and solubilized by ionic sodium. It is noted that when the aliginate is in excess, the solution is somewhat more like a thin jelly. Its pH reading on Hydrion test paper is about 10.

c. 96 parts by weight of alginic acid are mixed with 4 parts by weight of dry catalyst composed of equal parts of ABS acid and C—O—S as in section (a) in Example 10. By way of testing, 25 parts by weight of the mixture were placed in each of four pressure vessels. The vessels numbered 1, 2, 3, and 4 were heated respectively to 100° C., 92° C., 81° C., and 55° C. respectively for 24 hours, 25 hours, 90 hours, and 168 hours. The product in vessel 2 was considerably lighter in color than that in 1; the product in vessel 3 was semi-sintered and dark brown; and in vessel 4 the product was a light cream in color and not sintered or caked. The product in vessel 4 showed some complexing ability for iron, though not as much as the products in the other vessels.

EXAMPLE 11

A product prepared in accordance with Example 10 but substituting tragacanth gum (Supreme, or highest grade) for the alginate is placed in a pressure vessel which is closed and heated for 24 hours at a controlled temperature of about 100° C. The heated product has a complexing ability for iron.

The following example (12) illustrates the at least partial depolymerization of a substantially non-ionic natural plant hydrocolloid, representative of the large group of galactomannans, namely guar gum. Another prominent member of this group of plant hydrocolloids is locust bean gum, which behaves, when treated by the methodology of this invention, much like guar gum. Involved in this treatment of neutral plant hydrocolloids may be not only depolymerization but also repolymerization to molecular entities of structures somewhat different from those of the original gums because the viscosity of a solution of a gum treated in the manner of the following example is not greatly reduced, if at all, compared with that of an untreated gum, but other characteristics are changed, and they are changed for the better.

EXAMPLE 12

192 parts by weight of guar gum (General Mills' Supercol GF) are mixed with 8 parts by weight of dry catalyst composed of equal parts of ABS acid and C—O—S H–5 and roller in a ball mill with Burundum stones for about one hour. A free-flowing, non-caking mixture is formed. 25 parts by weight of this mixture are enclosed in a pressure vessel, the vessel is tapped or vibrated until the contents are compacted and most of the entrapped air is released thereby, and the vessel with contents is then heated for six hours and 45 minutes at a temperature of 100° C.

The processed gum, after cooling, is of about the same color as the original, unprocessed gum and has an odor much like that of fresh rye bread. When added to water, it forms a very nice gel which does not have the "snot-like" character of gels made from unprocessed gum. After standing exposed to the room atmosphere at room temperature for 6 days, the gel does not putrefy as does a gel made from an untreated guar gum which becomes putrefied and decomposes in 2 days and loses its gel nature and is very odoriferous. The above processing brings about a destruction of the natural enzymes of the untreated gum and any bacterial and fungal contaminations that generally affect natural plant hydrocolloids such as guar, tragacanth, karaya, locust bean gum and others.

If gels made from the untreated guar gum used in the above test and the treated one obtained therein are sheeted out on polyethylene sheeting supporting on glass plates, the dried gel pellicles obtained are almost indistinguishable except that the one made from the treated gum is almost transparent. Both pellicles are very flexible.

The above process is conveniently and inexpensively conducted, and successfully fulfills a commercial need, especially as to the sterilization of natural plant hydrocolloids.

What is claimed is:

1. A process of depolymerizing a carbohydrate comprising mixing a carbohydrate selected from a group consisting of starch, cellulose, hemicellulose, and natural plant hydrocolloid, and nonporous particles of colloidal, pyrogenic silica coated with a surfactant, organic acid selected from a group consisting of sulfonic acid having an alkyl radical with 10 to 20 carbon atoms, and sulfonic acid having an alkylbenzene group in which the alkyl group has ten to twenty carbon atoms, the coated particles having from two parts by weight of the said acid and one part by weight of said silica to one part by weight of said acid and two parts by weight of said silica, and the said acid being present in the resulting mix to the extent of 0.1% to about 10% by weight, the said mix being heated in the range of about 50°C. to about 120° C., whereby the said carbohydrate is depolymerized.

2. A process of depolymerizing a carbohydrate comprising mixing a carbohydrate selected from a group consisting of starch, cellulose, hemicellulose, and natural plant hydrocolloid in the presence of an organic surfactant acid selected from a group consisting of sulfonic acid having an alkyl radical with 10 to 20 carbon atoms, and sulfonic acid having an alkylbenzene group in which the alkyl group has ten to twenty carbon atoms, at a temperature of about 50° C. to about 120° C., the resulting mix containing about 0.1% to about 10% by weight of said acid, whereby the said carbohydrate is depolymerized.

3. In a process of depolymerizing carbohydrate material, the improvement which comprises reacting a carbohydrate selected from a group consisting of starch, cellulose, hemicellulose, and natural plant hydrocolloid with a surfactant organic acid selected from a group consisting of sulfonic acid having an alkyl radical with 10 to 20 carbon atoms, and sulfonic acid having an alkylbenzene group in which the alkyl group has 10 to 20 carbon atoms at a temperature of about 50° C. to about 120° C., whereby the carbohydrate is depolymerized.

* * * * *

UNITED STATES PATENT OFFICE
CERTIFICATE OF CORRECTION

Patent No. 3,901,874    Dated August 26, 1975

Inventor(s) William H. Hill

It is certified that error appears in the above-identified patent and that said Letters Patent are hereby corrected as shown below:

Column 4, line 29, "as" should be -- are --

Column 5, line 32, "through" should be -- thought --

Column 6, line 46, "device" should be -- devise --

Column 8, line 20, "extend of" should be -- extent on --

Column 18, line 47, "galaturonic" should be -- galacturonic --

Column 19, line 28, "aliginate" should be -- alginate --"

Column 20, line 8, "roller" should be -- rolled --

Column 20, line 33, "supporting" should be -- supported --

Signed and Sealed this fourth Day of May 1976

[SEAL]

Attest:

RUTH C. MASON
Attesting Officer

C. MARSHALL DANN
Commissioner of Patents and Trademarks